US012579669B2

(12) United States Patent
Yong et al.

(10) Patent No.: US 12,579,669 B2
(45) Date of Patent: Mar. 17, 2026

(54) ESTIMATING DEPTH BASED ON IRIS SIZE

(71) Applicant: GOOGLE LLC, Mountain View, CA (US)

(72) Inventors: Ming Yong, Mountain View, CA (US); Andrey Vakunov, Mountain View, CA (US); Ivan Grishchenko, Mountain View, CA (US); Dmitry Lagun, Mountain View, CA (US); Matthias Grundmann, Mountain View, CA (US)

(73) Assignee: Google LLC, Mountain View, CA (US)

( * ) Notice: Subject to any disclaimer, the term of this patent is extended or adjusted under 35 U.S.C. 154(b) by 492 days.

(21) Appl. No.: 17/788,819

(22) PCT Filed: May 21, 2020

(86) PCT No.: PCT/US2020/033928
§ 371 (c)(1),
(2) Date: Jun. 24, 2022

(87) PCT Pub. No.: WO2021/145913
PCT Pub. Date: Jul. 22, 2021

(65) Prior Publication Data
US 2023/0033956 A1    Feb. 2, 2023

Related U.S. Application Data

(60) Provisional application No. 62/960,514, filed on Jan. 13, 2020.

(51) Int. Cl.
*G06T 7/50*        (2017.01)
*G06T 5/70*        (2024.01)
(Continued)

(52) U.S. Cl.
CPC .................. *G06T 7/50* (2017.01); *G06T 5/70* (2024.01); *G06T 7/62* (2017.01); *G06V 10/82* (2022.01);
(Continued)

(58) Field of Classification Search
CPC .... G06T 7/50; G06T 5/70; G06T 7/62; G06T 2207/20084; G06T 2207/30201;
(Continued)

(56) References Cited

U.S. PATENT DOCUMENTS

2012/0007939 A1    1/2012  Michrowski et al.
2015/0195491 A1*   7/2015  Shaburov ............... H04N 7/147
                                                    348/14.12
(Continued)

FOREIGN PATENT DOCUMENTS

CN        105 654 040      6/2016
CN        110022753 A      7/2019
(Continued)

OTHER PUBLICATIONS

The International Search Report (ISR) for PCT/US2020/033928 dated Sep. 14, 2020, pp. 1-4.
(Continued)

*Primary Examiner* — Amandeep Saini
*Assistant Examiner* — Emma Rose Goebel
(74) *Attorney, Agent, or Firm* — McDonnell Boehnen Hulbert & Berghoff LLP

(57) ABSTRACT

Example embodiments relate to estimating depth information based on iris size. A computing system may obtain an image depicting a person and determine a facial mesh for a face of the person based on features of the face. In some instances, the facial mesh includes a combination of facial landmarks and eye landmarks. As such, the computing system may estimate an iris pixel dimension of an eye based
(Continued)

on the eye landmarks of the facial mesh and estimate a distance of the eye of the face relative to the camera based on the iris pixel dimension, a mean value iris dimension, and an intrinsic matrix of the camera. The computing system may further modify the image based on the estimated distance.

20 Claims, 9 Drawing Sheets

(51) Int. Cl.
*G06T 7/62* (2017.01)
*G06V 10/82* (2022.01)
*G06V 40/16* (2022.01)
*G06V 40/18* (2022.01)

(52) U.S. Cl.
CPC .......... *G06V 40/171* (2022.01); *G06V 40/193* (2022.01); *G06T 2207/20084* (2013.01); *G06T 2207/30201* (2013.01); *G06T 2207/30204* (2013.01)

(58) Field of Classification Search
CPC .......... G06T 2207/30204; G06T 11/00; G06V 10/82; G06V 40/171; G06V 40/193
See application file for complete search history.

(56) References Cited

U.S. PATENT DOCUMENTS

| | | | |
|---|---|---|---|
| 2015/0379716 A1* | 12/2015 | Peng ........................ | G06T 7/194 |
| | | | 382/106 |
| 2017/0169570 A1* | 6/2017 | Vashishtha ............. | G06V 40/19 |
| 2017/0221226 A1* | 8/2017 | Shen ......................... | G06T 7/80 |
| 2018/0137648 A1* | 5/2018 | Kang ................... | G06V 10/147 |
| 2018/0204058 A1* | 7/2018 | Yoo ....................... | G06V 40/193 |
| 2020/0004333 A1* | 1/2020 | Lee ......................... | G06V 40/18 |

FOREIGN PATENT DOCUMENTS

| | | |
|---|---|---|
| KR | 20180054401 A | 5/2018 |
| KR | 2019 0143287 | 12/2019 |
| WO | 2018/063451 A1 | 4/2018 |
| WO | 2019/070299 | 4/2019 |

OTHER PUBLICATIONS

The Written Opinion of the International Searching Authority for PCT/US2020/033928 dated Sep. 14, 2020, pp. 1-7.

* cited by examiner

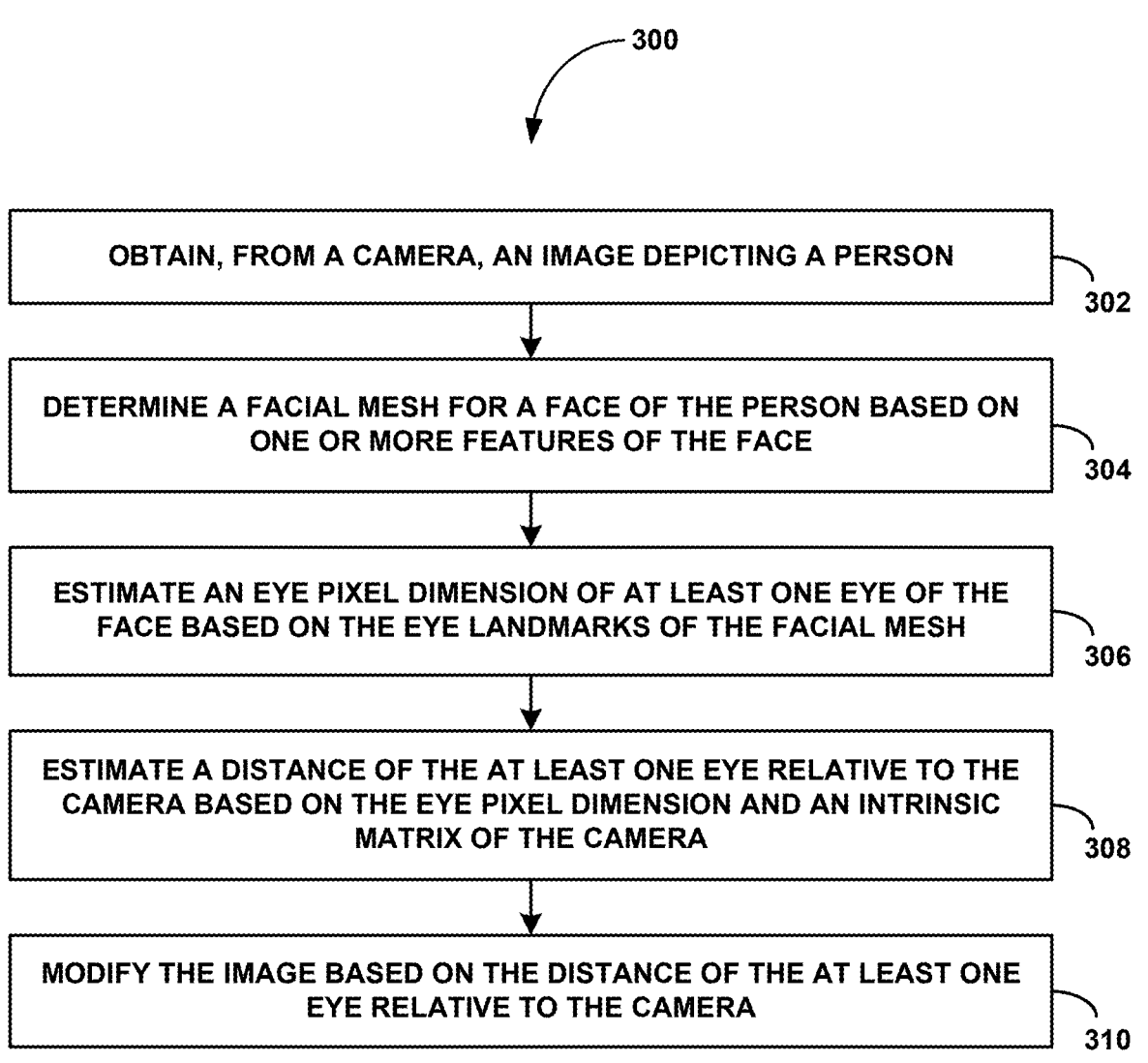

300

OBTAIN, FROM A CAMERA, AN IMAGE DEPICTING A PERSON

302

DETERMINE A FACIAL MESH FOR A FACE OF THE PERSON BASED ON ONE OR MORE FEATURES OF THE FACE

304

ESTIMATE AN EYE PIXEL DIMENSION OF AT LEAST ONE EYE OF THE FACE BASED ON THE EYE LANDMARKS OF THE FACIAL MESH

306

ESTIMATE A DISTANCE OF THE AT LEAST ONE EYE RELATIVE TO THE CAMERA BASED ON THE EYE PIXEL DIMENSION AND AN INTRINSIC MATRIX OF THE CAMERA

308

MODIFY THE IMAGE BASED ON THE DISTANCE OF THE AT LEAST ONE EYE RELATIVE TO THE CAMERA

ESTIMATING DEPTH BASED ON IRIS SIZE

CROSS-REFERENCE TO RELATED APPLICATION

This application is a U.S. National Phase of International Application No. PCT/US2020/033928, filed May 21, 2020, which claims priority to U.S. Provisional Application No. 62/960,514, filed Jan. 13, 2020, both of which are incorporated by reference herein in their entirety.

BACKGROUND

Many modern computing devices, such as mobile phones, personal computers, and tablets, include image capture devices (e.g., still and/or video cameras). The image capture devices can capture images that can depict a variety of scenes, including scenes that involve people, animals, landscapes, and/or objects.

An image capture device typically generates a two-dimensional representation of a three-dimensional scene (3D) when capturing an image. In order to obtain three-dimensional (3D) information about a scene, multiple components are typically used. For instance, a stereo camera set up is a common technique used to generate 3D information for a scene. A stereo camera involves the use of two or more image capture components that simultaneously capture multiple images to create or simulate a 3D stereoscopic image. Although the stereo camera can produce depth information regarding a scene, the use of multiple image capture components might increase the costs and complexity associated with obtaining the depth information.

SUMMARY

Example embodiments presented herein relate to depth estimation techniques that involve the use of a single image capturing component. Particularly, a smartphone or another type of processing device (e.g., a computing system) may identify the presence of a person's face within an image captured by an image capturing component and subsequently generate a facial mesh that represents the contours and features of the person's face. Based on eye landmarks of the facial mesh that indicate the outline features of one or both eyes of the face, the device may estimate one or more eye pixel dimensions for at least one eye. For instance, the device may estimate a pixel size of the iris of the eye as represented in the image. Using the one or more estimated eye pixel dimensions, the intrinsic matrix of the image capturing component that captured the image, and a mean value eye dimension corresponding to the estimated eye pixel dimensions, a depth may be estimated that represents the distance between the image capturing component and the person's face. The depth estimate can then be used to enhance the original image using various techniques, such as the generation of a new version of the original image that focuses upon the person while also blurring other portions of the image in a manner similar to the Bokeh effect.

Accordingly, in a first example embodiment, a method is provided. The method involves obtaining, at a computing system and from a camera, an image depicting a person and determining a facial mesh for a face of the person based on one or more features of the face. The facial mesh includes a combination of facial landmarks and eye landmarks. The method further involves estimating an eye pixel dimension for at least one eye of the face based on the eye landmarks of the facial mesh and estimating, by the computing system, a distance of the at least one eye relative to the camera based on the eye pixel dimension and an intrinsic matrix of the camera. The method also involves modifying the image based on the distance of the at least one eye relative to the camera.

In a second example embodiment, a system is provided. The system includes a camera having an intrinsic matrix and a computing system configured to perform operations. The operations include obtaining, from the camera, an image depicting a person and determining a facial mesh for a face of the person based on one or more features of the face. The facial mesh includes a combination of facial landmarks and eye landmarks. The operations further include estimating an eye pixel dimension for at least one eye of the face based on the eye landmarks of the facial mesh and estimating a distance of the at least one eye relative to the camera based on the eye pixel dimension and the intrinsic matrix of the camera. The operations also include modifying the image based on the distance of the at least one eye relative to the camera.

In a third example embodiment, a non-transitory computer-readable medium configured to store instructions is provided. The program instructions may be stored in the data storage, and upon execution by a computing system may cause the computing system to perform operations in accordance with the first and second example embodiments.

In a fourth example embodiment, a system may include various means for carrying out each of the operations of the example embodiments above.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 is a flow chart, according to example embodiments.

DETAILED DESCRIPTION

Figure 1A:
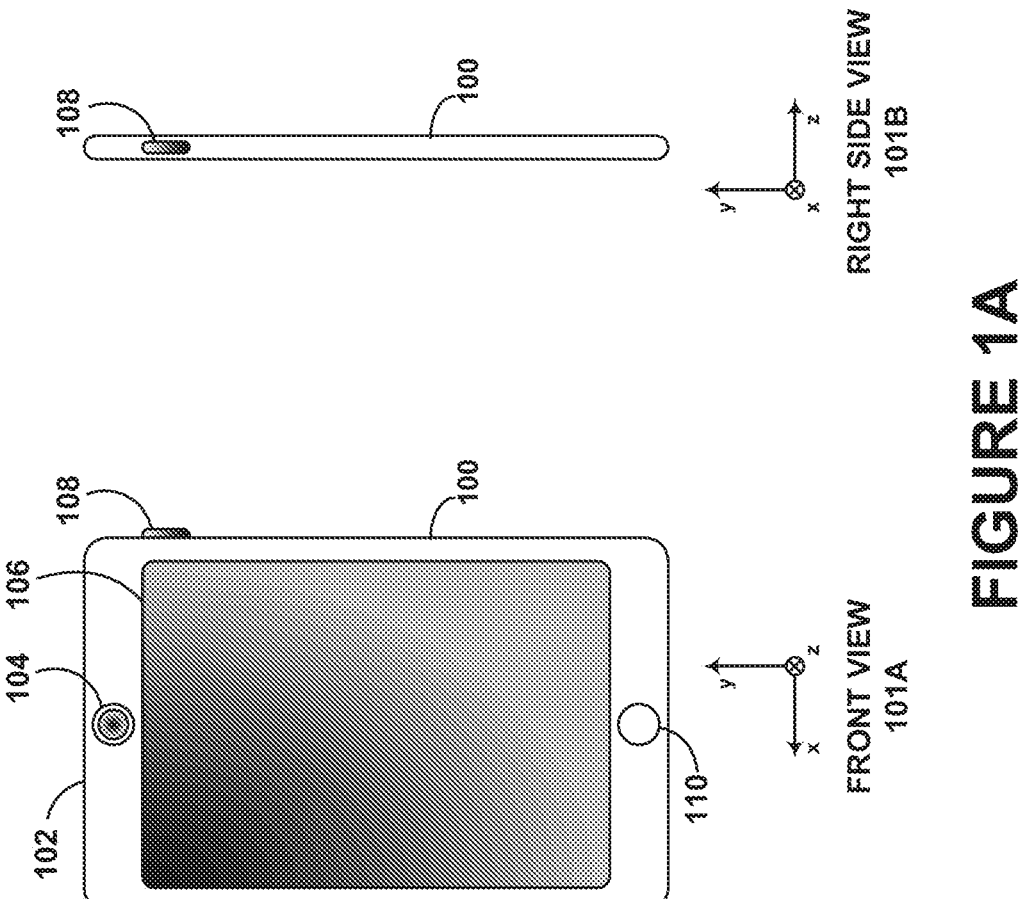
FIG. 1A depicts a front and a side view of a digital camera device, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Depending on context, a "camera" may refer to an individual image capture component, or a device that contains one or more image capture components. In general, an image capture component may include an aperture, lens, recording surface, and shutter, as described below. Moreover, in some implementations, the image processing steps described herein may be performed by a camera device, while in other implementations, the image processing steps may be performed by a computing device in communication with (and perhaps controlling) one or more camera devices.

1. EXAMPLE IMAGE CAPTURE DEVICES

As cameras become more popular, they may be employed as standalone hardware devices or integrated into other types of devices. For instance, still and video cameras are now regularly included in wireless computing devices (e.g., smartphones and tablets), laptop computers, wearable computing devices, video game interfaces, home automation devices, and automobiles and other types of vehicles.

An image capture component of a camera may include one or more apertures through which light enters, one or more recording surfaces for capturing the images represented by the light, and one or more lenses positioned in front of each aperture to focus at least part of the image on the recording surface(s). The apertures may be fixed size or adjustable.

In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory). The image sensor may include an array of photosites configured to capture incoming light through an aperture. When exposure occurs to capture an image, each photosite may collect photons from incoming light and store the photons as an electrical signal. Once the exposure finishes, the camera may close each of the photosites and proceed to measure the electrical signal of each photosite.

The signals of the array of photosites of the image sensor can then be quantified as digital values with a precision that may be determined by the bit depth. Bit depth may be used to quantify how many unique colors are available in an image's color palette in terms of "bits" or the number of 0's and 1's, which are used to specify each color. This does not mean that the image necessarily uses all of these colors, but that the image can instead specify colors with that level of precision. For example, for a grayscale image, the bit depth may quantify how many unique shades are available. As such, images with higher bit depths can encode more shades or colors since there are more combinations of 0's and 1's available.

To capture a scene in a color image, a color filter array (CFA) positioned nearby the image sensor may permit only one color of light from entering into each photosite. For example, a digital camera may include a CFA (e.g., Bayer array) that allows photosites of the image sensor to only capture one of three primary colors (red, green, blue (RGB)). Other potential CFAs may use other color systems, such as a cyan, magenta, yellow, and black (CMYK) array. As a result, the photosites may measure the colors of the scene for subsequent display in a color image.

In some examples, a camera may utilize a Bayer array that consists of alternating rows of red-green and green-blue filters. Within the Bayer array, each primary color does not receive an equal fraction of the total area of the photosite array of the image sensor because the human eye is more sensitive to green light than both red and blue light. Particularly, redundancy with green pixels may produce an image that appears less noisy and more detailed. As such, the camera may approximate the other two primary colors in order to have full color at every pixel when configuring the color image of the scene. For example, the camera may perform Bayer demosaicing or an interpolation process to translate the array of primary colors into an image that contains full color information at each pixel. Bayer demosaicing or interpolation may depend on the image format, size, and compression technique used by the camera.

One or more shutters may be coupled to or nearby the lenses or the recording surfaces. Each shutter may either be in a closed position, in which it blocks light from reaching the recording surface, or an open position, in which light is allowed to reach the recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photosites. While the electronic shutter remains open, the photosites may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that can result in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras may include software to control one or more camera functions and/or settings, such as aperture size, exposure time, gain, and so on. Additionally, some cameras may include software that digitally processes images during or after when these images are captured.

As noted above, digital cameras may be standalone devices or integrated with other devices. As an example, FIG. 1A illustrates the form factor of a digital camera device 100 as seen from a front view 101A and a side view 101B. In addition, FIG. 1B also illustrates the form factor of the digital camera device 100 as seen from a rear view 101C and another rear view 101D. The digital camera device 100 may be a mobile phone, a tablet computer, or a wearable computing device. Other embodiments are possible.

Figure 1B:
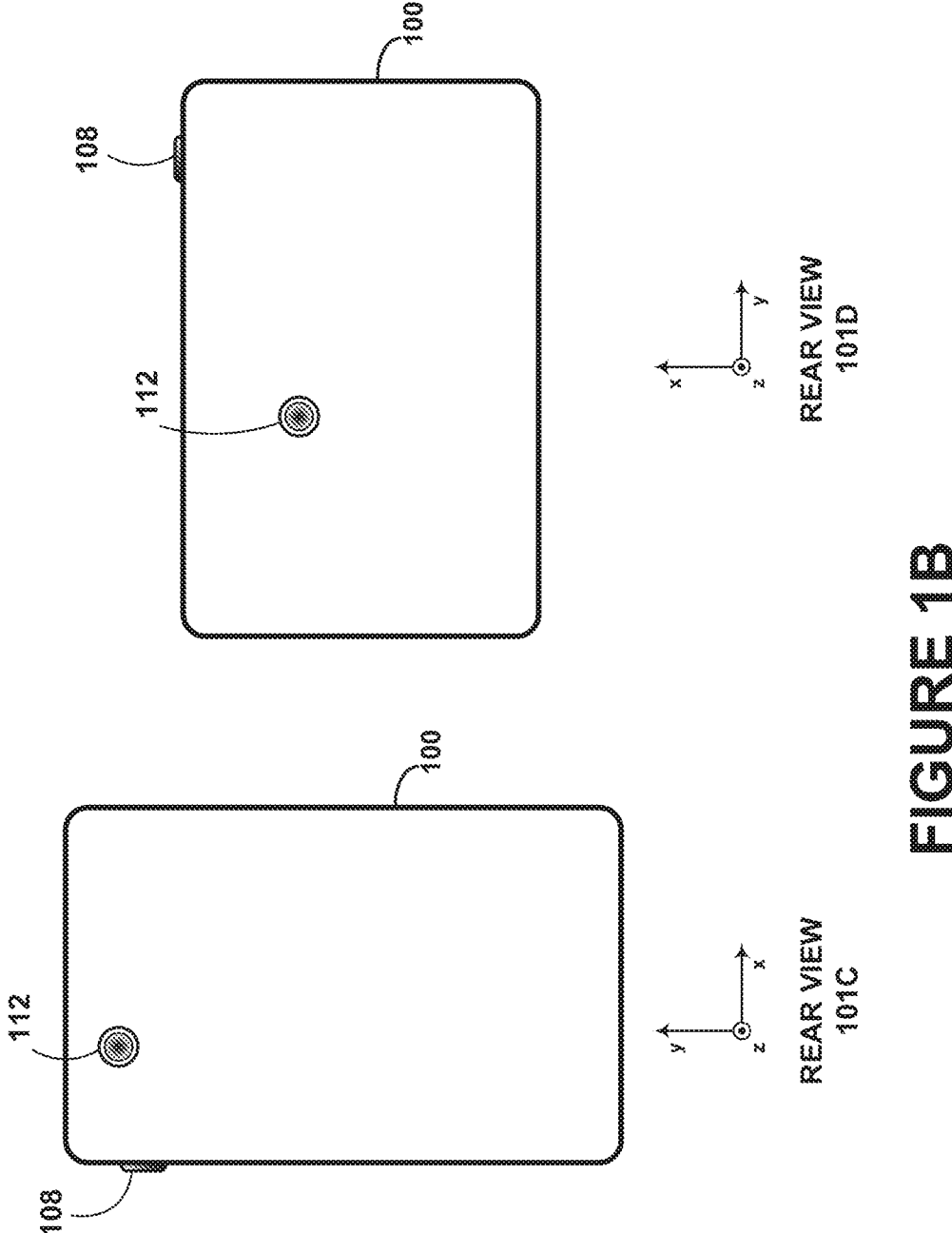
FIG. 1B depicts rear views of a digital camera device, according to example embodiments.

As shown in FIGS. 1A and 1B, the digital camera device 100 may include various elements, such as a body 102, a front-facing camera 104, a multi-element display 106, a shutter button 108, and additional buttons 110. The front-facing camera 104 may be positioned on a side of body 102 typically facing a user while in operation, or on the same side as multi-element display 106.

As depicted in FIG. 1B, the digital camera device 100 further includes a rear-facing camera 112. Particularly, the rear-facing camera 112 is shown positioned on a side of the body 102 opposite from the front-facing camera 104. In addition, the rear views 101C and 101D shown in FIG. 1B represent two alternate arrangements of rear-facing camera 112. Nonetheless, other arrangements are possible. Also, referring to the cameras as front facing or rear facing is arbitrary, and digital camera device 100 may include one or multiple cameras positioned on various sides of body 102.

The multi-element display 106 could represent a cathode ray tube (CRT) display, a light emitting diode (LED) display, a liquid crystal (LCD) display, a plasma display, or any other type of display known in the art. In some embodiments, the multi-element display 106 may display a digital representation of the current image being captured by front-facing camera 104 and/or rear-facing camera 112, or an image that could be captured or was recently captured by any one or more of these cameras. Thus, the multi-element display 106 may serve as a viewfinder for the cameras. The multi-element display 106 may also support touchscreen and/or presence-sensitive functions that may be able to adjust the settings and/or configuration of any aspect of digital camera device 100.

The front-facing camera 104 may include an image sensor and associated optical elements such as lenses. As such, the front-facing camera 104 may offer zoom capabilities or could have a fixed focal length. In other embodiments, interchangeable lenses could be used with the front-facing camera 104. The front-facing camera 104 may have a variable mechanical aperture and a mechanical and/or electronic shutter. The front-facing camera 104 also could be configured to capture still images, video images, or both. The rear-facing camera 112 may be a similar type of image capture component and may include an aperture, lens, recording surface, and shutter. Particularly, the rear-facing camera 112 may operate similar to the front-facing camera 104.

Either or both of the front facing camera 104 and the rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover 3D models from an object are possible within the context of the embodiments herein.

Either or both of front facing camera 104 and/or rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. The ambient light sensor may also be used to determine an exposure times for image capture.

The digital camera device 100 could be configured to use the multi-element display 106 and either the front-facing camera 104 or the rear-facing camera 112 to capture images of a target object. The captured images could be a plurality of still images or a video stream. The image capture could be triggered by activating the shutter button 108, pressing a soft-key on multi-element display 106, or by some other mechanism. Depending upon the implementation, the images could be captured automatically at a specific time interval, for example, upon pressing the shutter button 108, upon appropriate lighting conditions of the target object, upon moving the digital camera device 100 a predetermined distance, or according to a predetermined capture schedule.

In some examples, one or both of the front-facing camera 104 and the rear-facing camera 112 are calibrated monocular cameras. A monocular camera may be an image capturing component configured to capture 2D images. For instance, the monocular camera may use a modified refracting telescope used to magnify the images of distance objects by passing light through a series of lenses and prisms. As such, the monocular cameras and/or other types of cameras may have an intrinsic matrix that can be used for depth estimation techniques presented herein. A camera's intrinsic matrix is used to transform 3D camera coordinates to 2D homogenous image coordinates.

As noted above, the functions of the digital camera device 100—or another type of digital camera—may be integrated into a computing device, such as a wireless computing device, cell phone, tablet computer, wearable computing device, robotic device, laptop computer, vehicle camera, and so on. For purposes of example, FIG. 2 is a simplified block diagram showing some of the components of an example computing system 200 that may include camera components 224.

By way of example and without limitation, the computing system 200 may be a cellular mobile telephone a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robotic device, a vehicle, or some other type of device equipped with at least some image capture and/or image processing capabilities. It should be understood that the computing system 200 may represent a physical camera device such as a digital camera, a particular physical hardware platform on which a camera application operates in software, or other combinations of hardware and software that are configured to carry out camera functions.

Figure 2:
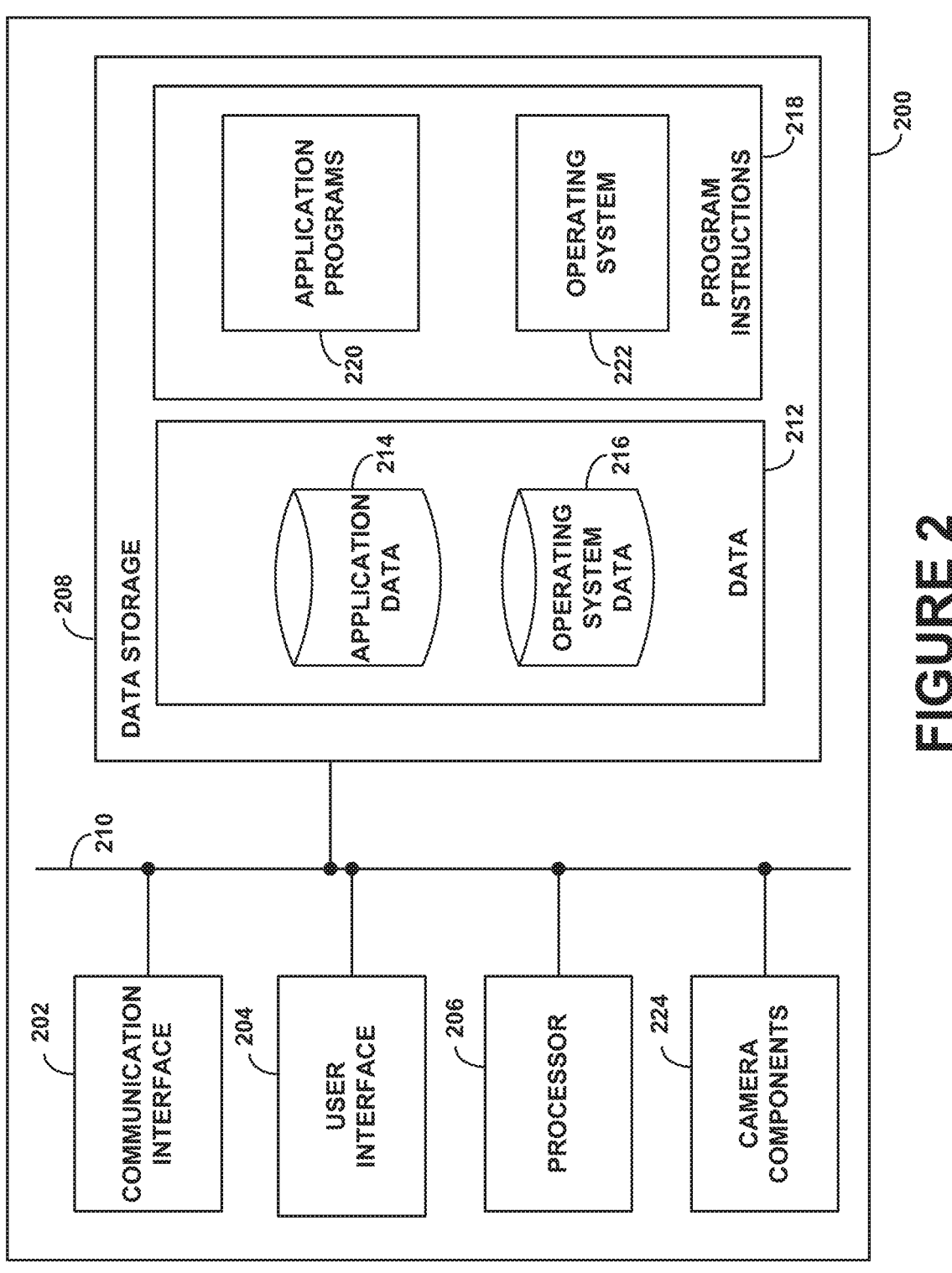
FIG. 2 depicts a block diagram of a computing system with image capture capability, according to example embodiments.

As shown in FIG. 2, the computing system 200 may include a communication interface 202, a user interface 204, a processor 206, data storage 208, and camera components 224, all of which may be communicatively linked together by a system bus, network, or other connection mechanism 210.

The communication interface 202 may allow the computing system 200 to communicate, using analog or digital modulation, with other devices, access networks, and/or transport networks. Thus, the communication interface 202 may facilitate circuit-switched and/or packet-switched communication, such as plain old telephone service (POTS) communication and/or Internet protocol (IP) or other packetized communication. For instance, the communication interface 202 may include a chipset and antenna arranged for wireless communication with a radio access network or an access point. Also, the communication interface 202 may take the form of or include a wireline interface, such as an Ethernet, Universal Serial Bus (USB), or High-Definition Multimedia Interface (HDMI) port. The communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over the communication interface 202. Furthermore, the communication interface 202 may comprise multiple physical communication interfaces (e.g., a Wifi interface, a BLUETOOTH® interface, and a wide-area wireless interface).

The user interface 204 may function to allow the computing system 200 to interact with a human or non-human user, such as to receive input from a user and to provide output to the user. Thus, the user interface 204 may include input components such as a keypad, keyboard, touch-sensitive or presence-sensitive panel, computer mouse, trackball, joystick, microphone, and so on. The user interface 204 may also include one or more output components such as one or more display screens which, for example, may be combined with a presence-sensitive panel. The display screen may be based on CRT, LCD, and/or LED technologies, or other technologies now known or later developed. The user interface 204 may also be configured to generate audible output(s), via a speaker, speaker jack, audio output port, audio output device, earphones, and/or other similar devices.

In some embodiments, the user interface 204 may include a display that serves as a viewfinder for still camera and/or video camera functions supported by the computing system 200. Additionally, the user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

The processor 206 may include one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with the processor 206. Data storage 208 may include removable and/or non-removable components.

The processor 206 may be capable of executing the program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by the computing system 200, cause the computing system 200 to carry out any of the methods, processes, or operations disclosed in this specification and/or the accompanying drawings. The execution of program instructions 218 by the processor 206 may result in the processor 206 using data 212.

By way of example, the program instructions 218 may include an operating system 222 (e.g., an operating system kernel, device driver(s), and/or other modules) and one or more application programs 220 (e.g., camera functions, address book, email, web browsing, social networking, image applications, and/or gaming applications) installed on the computing system 200. Similarly, data 212 may include operating system data 216 and application data 214. The operating system data 216 may be accessible primarily to the operating system 222, and the application data 214 may be accessible primarily to one or more of the application programs 220. The application data 214 may be arranged in a file system that is visible to or hidden from a user of the computing system 200.

The application programs 220 may communicate with the operating system 222 through one or more application programming interfaces (APIs). These APIs may facilitate, for instance, the application programs 220 reading and/or writing application data 214, transmitting or receiving information via the communication interface 202, receiving and/or displaying information on the user interface 204, and so on.

In some vernaculars, the application programs 220 may be referred to as "apps" for short. Additionally, the application programs 220 may be downloadable to the computing system 200 through one or more online application stores or application markets. However, application programs can also be installed on the computing system 200 in other ways, such as via a web browser or through a physical interface (e.g., a USB port) on the computing system 200.

The camera components 224 may include, but are not limited to, an aperture, shutter, recording surface (e.g., photographic film and/or an image sensor), lens, and/or shutter button. As such, the camera components 224 may be controlled at least in part by software executed by the processor 206. In some examples, the camera components 224 may include one or more image capturing components, such as a monocular camera. Although the camera components 224 are shown as part of the computing system 200, they may be physically separate in other embodiments. For instance, the camera components 224 may capture and provide an image via a wired or wireless connection to the computing system 200 for subsequent processing.

2. EXAMPLE OPERATIONS

As discussed above, an image captured by a camera can include intensity values with bright pixels having higher intensity values and dark pixels having lower intensity values. In some instances, an image can also represent depth of objects within a scene with the depths indicating the distance of one or more objects relative to the camera setup that captured the image. For instance, depth information may be used to direct a viewer on a particular aspect of the image, such as a person, while also blurring the background to enhance the overall image. A conventional type of camera used to generate depth information is a stereo camera, which might involve using two or more image capture components to simultaneously capture multiple images that can be used to generate depth information. Although the stereo camera can produce depth information about a scene, the use of multiple image capturing components can increase the costs and complexity associated with generating the depth information.

Example embodiments presented herein relate to depth estimation techniques that can be performed using a single camera. Particularly, a smartphone or another type of processing device (e.g., a computing system) may identify the presence of a person's face within an image captured by a single camera (e.g., a monocular camera) and subsequently generate a facial mesh that represents the contours of features of the person's face. The facial mesh may include facial landmarks arranged according to features of the person's face and eye landmarks arranged according to the positions and dimensions of one or both eyes of the person's face. For example, the eye landmarks may include a set of iris landmarks positioned relative to the iris of an eye to provide information regarding the iris. For instance, iris landmarks may be positioned around the iris of an eye as well as other places relative to the iris (e.g., an iris landmark mapping a center of the iris). As a result, the facial mesh may convey information about the person's face as depicted within the image. In some embodiments, the facial mesh may also provide information regarding the position of the person's face relative to other objects within the scene captured by the camera.

As such, the device may use the eye landmarks of the facial mesh to estimate one or more eye pixel dimensions for at least one eye. For instance, an estimated eye dimension may represent the pixel size of the eye's iris (e.g., a vertical or horizontal diameter of the iris quantified in pixels as represented in the image). Another estimated eye dimension may be a pixel eye dimension that represents a pixel size of the eye overall as depicted in the image captured by the camera. Other examples of eye dimension estimations are possible. For example, the eye dimension may represent a diameter of the corneal of the eye.

In addition, the device may use a mean value eye dimension that corresponds to the determined eye pixel dimension for depth estimation. The mean value eye dimension may represent an average eye size and be based on ophthalmology information or other measurements from a number of eyes. The ophthalmology information may provide dimensions of aspects of the eyes that are applicable for various people. For example, the ophthalmology information may specify the average horizontal diameter, average vertical diameter, or other measurements for the iris of an adult. The ophthalmology information may represent normalized measurements obtained from numerous people.

In one embodiment, the mean value eye dimension may represent an average iris size measured in millimeters or another unit when the eye pixel dimension corresponds to the iris size measured in pixels. For example, when the device estimated a quantity of pixels representing the horizontal diameter of the iris as depicted in the image, the device may further use a mean value eye dimension that represents the average horizontal diameter of an iris in millimeters or another unit. In another example the device may use a mean value eye dimension that represents the average vertical diameter of an iris when the eye pixel dimension conveys a quantity of pixels representing the vertical diameter of the iris as depicted in the image.

The device may obtain the mean value eye dimension from another computing system or memory. For example, the device may access eye data (e.g., mean value eye dimensions) via a wireless connection with a database. In some embodiments, the device may have the mean eye value stored locally, which can reduce time required to estimate depth of a person's face within an image.

The device may then use one or more eye pixel dimensions and one or more corresponding mean value eye dimensions along with the camera's intrinsic matrix that captured the image to estimate a depth of the person's face relative to the camera. The estimated depth of the person can be subsequently used to enhance the original image. For example, the device may generate a new image based on the original image that enhances the presence of the person within the image via a simulation of the Bokeh effect and/or using other image enhancement techniques. By estimating depth of a person within an image based on an estimate eye pixel dimension, a mean value eye dimension, and the camera's intrinsic matrix, the overall cost and complexity associated with generating depth information for a scene can be reduced since the technique eliminates the need for multiple cameras.

To further illustrate, FIG. 3 shows a flow chart for depth estimation using an image obtained via a single image capturing component. The embodiment illustrated by FIG. 3 may be carried out by a computing system, such as the digital camera device 100 shown in FIG. 1. The embodiment, however, can also be carried out by other types of devices or device subsystems, such as by a computing system positioned remotely from a camera. Further, the embodiment may be combined with any aspect or feature disclosed in this specification or the accompanying drawings.

At block 302, the method 300 may involve obtaining, from a camera, an image depicting a person. The computing system (or a subsystem of a computing system) may obtain the image from a camera via a wired or wireless connection. For example, the computing system may be a smartphone configured with a camera that is used to capture the image. Alternatively, the computing system may be remotely positioned from the camera and obtain the image via a wireless or wired connection.

The camera may represent any type of image capturing component. For instance, the camera may include one or more apertures, lenses, and recording surfaces. As such, the camera may have an intrinsic matrix that enables a transformation of 3D camera coordinates to 2D homogenous image coordinates.

The image may depict one or more people within a scene. For instance, a smart phone or another type of device may use a camera to capture a portrait of a person. Upon obtaining the image from the camera, the computing system may perform an initial review of the image to detect a person's face prior to performing other functions of the method 300. For instance, the computing system may use an image processing technique, machine learning, a trained neural network, or another process (e.g., machine learning) to identify the person's face. In addition, in some examples, the computing system may require that the image is captured when the camera is in a particular camera mode (e.g., portrait mode) prior to performing one or more functions of the method 300.

In further embodiments, the image may depict an animal or another type of face (e.g., a painting of a person). As such, the device may detect the face of the animal or artwork prior to proceeding to perform other functions of the method 300.

At block 304, the method 300 may involve determining a facial mesh for a face of the person based on one or more features of the face. The facial mesh may include a combination of facial landmarks and eye landmarks arranged to represent information regarding the face. In some embodiments, the facial mesh may be generated based on the image and provide information about at least one person as depicted within the image. For instance, the facial mesh may indicate which pixels represent portions of the person's face.

The computing system may perform a cursory review of the image using one or more image processing techniques to identify the presence of one or more people and subsequently generate a facial mesh for at least one person. For instance, the computing system may be configured to generate the facial mesh for a person positioned approximately at the center of the image when analyzing an image with multiple people. Within examples, various image processing techniques may be used to identify information about the image, such as detection of the presence of the person and/or the person's face. Example image processing techniques include, but are not limited to, feature extraction, pattern recognition, machine learning, and neural networks.

The facial mesh generated by the computing system for a face may include a set of facial landmarks and a set of eye landmarks. A landmark may be a circular point (or a point having another shape) arranged in a specific way to map information about the person's face. In particular, the computing device may map the facial landmarks to represent contours of the face and map eye landmarks to represent contours of one or both eyes of the face. For instance, the facial landmarks may be points arranged to represent facial features of the person's face, such as the cheeks, lips, eyebrows, ears, etc. As a result, the facial landmarks may convey the layout and contours of the person's face.

The eye landmarks are similar to the facial landmarks, but are specific to one or both eyes of the person's face. In particular, the eye landmarks may specify a location and outline dimensions for one or both eyes. In some embodiments, the eye landmarks may include a set of iris landmarks clearly defining the location, position, and size of the iris. Together, the combination of facial landmarks and eye landmarks can provide a representation of the arrangement and features of a person's face as captured within the image.

The total number of facial landmarks and eye landmarks used to generate a facial mesh may vary within examples. For example, a facial mesh may include approximately 500 facial landmarks and 30 eye landmarks per eye with 5 iris landmarks defining a center and outline of the iris. These quantities can vary for other facial meshes and may depend on the quantity of pixels used to represent the person's face within the image. In addition, the size, color, and style of the points used for facial landmarks and eye landmarks (and iris landmarks) can differ within examples. In some instances, the facial landmarks and eye/iris landmarks may be circular points uniform in size. Alternatively, different shape and sized points may be used. Further, a facial mesh may be generated using different color facial landmarks and eye landmarks. For instance, the eye landmarks may be a first color (e.g., green) and the iris landmarks may be a second color (e.g., red). In other embodiments, the facial mesh may include lines or other structures used to convey information about the person's face.

In some examples, a neural network is trained to determine the facial mesh for the person's face. For example, the neural network may be trained using pairs of images depicting faces with and without facial meshes. As a result, the computing system may use the neural network to determine the facial mesh and further measure facial features based on the facial mesh. Alternatively, one or more image processing techniques may be used to develop a facial mesh for a face captured within one or more images. For example, the computing system may use a combination of a neural network and edge detection to generate one or more facial meshes for faces represented within an image.

At block 306, the method 300 may involve estimating an eye pixel dimension for at least one eye of the face based on the eye landmarks of the facial mesh. After generating the facial mesh for a face depicted within the image, the computing system may use the eye landmarks of the facial mesh to estimate one or more eye dimensions for one or both of the person's eyes.

In some embodiments, estimating the eye dimension for an eye may involve estimating a pixel size of the iris of the eye based on iris landmarks positioned around the iris of the eye. For instance, the pixel size of the iris may correspond to a quantity of pixels that represents a horizontal diameter of the iris as depicted in the image. Alternatively, the pixel size of the iris may correspond to a quantity of pixels that represents a vertical diameter of the iris as depicted in the image. As such, the computing system may use eye landmarks and/or iris landmarks when estimating an eye pixel dimension (e.g., an iris pixel dimension). In some examples, the computing system may perform multiple eye pixel dimension estimations and use an average of the estimations as the output eye dimension used at block 308.

The computing system may further perform a comparison between the pixel size of the iris of the eye and an average pixel iris size. The average pixel iris size may be based on multiple pixel measurements of the iris and/or another value (e.g., a threshold range). Based on the comparison, the computing system may determine whether the pixel size of the iris satisfies a threshold difference prior to estimating the distance of the eye relative to the camera. When the estimated eye dimension fails to satisfy the threshold difference (i.e., differs substantially from a target eye dimension), the computing system may repeat one or more processes to derive a new eye dimension estimation.

In addition, the computing system may also use a mean value eye dimension corresponding to the eye pixel dimension. In particular, the mean value eye dimension may indicate a size of the person's eye based on eye data. When an iris pixel dimension is used, the mean value eye dimension may correspond to a mean value iris dimension that matches. For instance, both the iris pixel dimension and the mean value iris dimension may represent the same parameter of the iris, such as a horizontal diameter of the iris.

At block 308, the method 300 may involve estimating a distance of the at least one eye relative to the camera based on the eye pixel dimension of the eye and an intrinsic matrix of the camera. The computing device may use the camera's intrinsic matrix and one or more estimated eye pixel dimensions (e.g., the pixel iris size) to calculate an estimated depth of the eye relative to the camera. For example, the camera may be a calibrated monocular camera with an intrinsic matrix that the computing system may utilize in combination with one or more eye dimensions during depth estimation. In addition, the device may also use a mean value eye dimension to represent the person's eye in millimeters or another unit when estimating the distance between the camera and the person's face. For instance, the device may use a combination of a pixel iris estimation, the intrinsic matrix, and a mean value iris dimension to estimate the distance from the camera to the person's face.

The intrinsic matrix is used to transform 3D camera coordinates to 2D image coordinates. An example intrinsic matrix can be parameterized as follows:

$$K = \begin{bmatrix} f_x & s & x_0 \\ 0 & f_y & y_0 \\ 0 & 0 & 1 \end{bmatrix} \quad [1]$$

Each intrinsic parameter shown above describes a geometric property of the camera. The focal length, also referred to as pixel focal length, is represented by $f_x$, $f_y$ and corresponds to the distance between the aperture of the camera and the image plane. The focal length is conventionally measured in pixels and $f_x$ and $f_y$ have the same value when the camera simulates a true pinhole camera producing square pixels. In practice, $f_x$ and $f_y$ can differ for various reasons, such as flaws in the digital camera sensor, the image has been non-uniformly scaled in post-processing, the camera's lens causes unintentional distortion, or errors in camera calibration. When $f_x$ and $f_y$ differ, the resulting image may be made up of non-square pixels.

In addition, the principal point offset is represented by $x_0$ and $y_0$. A camera's principal axis is the line perpendicular to the image plane that passes through the camera's aperture. The intersection of the principal axis with the image plan is referred to the principal point. As such, the principal point offset is the location of the principal point relative to the image plane's origin. In addition, axis skew is represented by s in the matrix above and causes shear distortion in the projected image. As such, the computing system may use a camera's intrinsic matrix and an estimated eye dimension derived from the facial mesh to estimate a depth of the person relative to the camera. In some examples, the facial mesh may be further used during depth estimation.

At block 310, the method 300 may involve modifying the image based on the distance of the at least one eye relative to the camera. Modifying the image may involve adjusting aspects of the original image provided by the camera and/or producing a new, enhanced image that corresponds to the original image.

The computing system may use the depth estimation to segment the image into background and foreground portions. This way, the computing system can blur one or more pixels of background portions in the original image when producing the enhanced, final image. Particularly, focal features of the scene (e.g., the person in the center of the image) present in the foreground may retain sharp pixels while other features that are part of the background of the scene can be blurred to enhance the final image. In some instances, pixels of features in the background of the image may be blurred in proportion based on how far each background feature is from the in-focus plane (e.g., from the camera). The estimated depth map can be used to estimate the distances between background features and the in-focus plane.

In an embodiment, the computing system may produce a final image that includes one or more enhancements compared to the originally captured image. For instance, the final image may utilize a blurring effect to help draw the attention of a viewer towards the main focus in the image (e.g., the person or the person's face) in a manner similar to an image captured with a shallow depth of field. Particularly, an image with a shallow depth of field can help direct the attention of the viewer towards the focal point of the image and can also help suppress a cluttered background enhancing the overall presentation of the image.

In another embodiment, blurring pixels of background features can involve replacing the pixels with a translucent disk of the same color but varying size. By compositing all these disks in a depth order in a manner similar to averaging the disks, the results in the enhanced, final image are similar to a real optical blur that derives from using a single-lens reflex (SLR) camera with a big lens. The synthetic defocus applied using the above techniques can produce a disk-shaped Bokeh effect in the final image without requiring extensive equipment that other cameras often use to achieve the effect. Further, unlike SLR cameras, the Bokeh effect can be modified to have other shapes within final images using the above techniques since the Bokeh effect is applied in a synthetic manner.

3. EXAMPLE FACIAL MESH DETERMINATION

Figure 4:
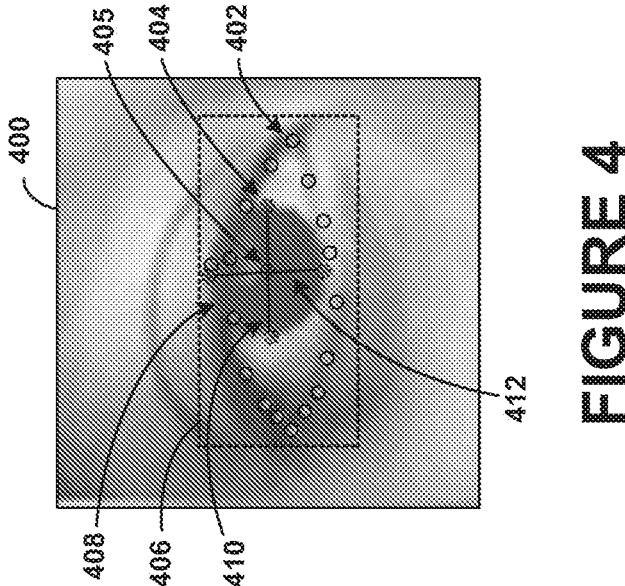
FIG. 4 illustrates an eye portion of a facial mesh, according to example embodiments.

As discussed above, a computing system (e.g., a smartphone) may generate a facial mesh for one or more faces depicted within an image prior to performing a depth estimation technique. To illustrate, FIG. 4 shows an eye portion of a facial mesh generated for the face of a person captured within an image.

The eye portion 400 may be part of a facial mesh that includes facial landmarks (not shown), eye landmarks 402, and iris landmarks 404, 405. The eye landmarks 402 and iris landmarks 404, 405 may be combined such that they generally appear as eye landmarks in some embodiments. Alternatively, a facial mesh may include only eye landmarks 402 and/or iris landmarks 404, 405 in some examples. The facial landmarks may be arranged to map features of the person's face, such as the positions of cheeks, lips, eyebrows, ears, and general outline of the face.

The eye landmarks shown in the eye portion 400 of the facial map are arranged to map aspects of the eye 406 (shown in the dotted box). In the embodiment shown in FIG. 4, the eye landmarks include outline eye landmarks 402 shown as solid points and iris landmarks 404, 405 shown as dotted points positioned around the iris 408. The outline eye landmarks 402 are arranged to outline the entire eye 406. As shown in FIG. 4, the outline eye landmarks 402 may be a set of points (e.g., 17 points) arranged to enable the computing system to identify an outline of the eye 406.

In addition to the outline eye landmarks, 402, the iris landmarks 404, 405 are arranged to map the position of the iris 408 within the eye 406. In particular, four iris landmarks 404 are positioned around the iris 408 and one iris landmark 405 is positioned at an approximate center of the iris 408. As shown, the iris landmarks 404, 405 may divide the iris 408 into quadrants and may enable a computing system to estimate a horizontal diameter 410 of the iris 408 and/or a vertical diameter 412 of the iris 408. One or both of the estimated eye dimensions may be used to estimate a depth of the eye 406 relative to the camera that captured the image of the person.

4. EXAMPLE DEPTH ESTIMATIONS

Figure 5:
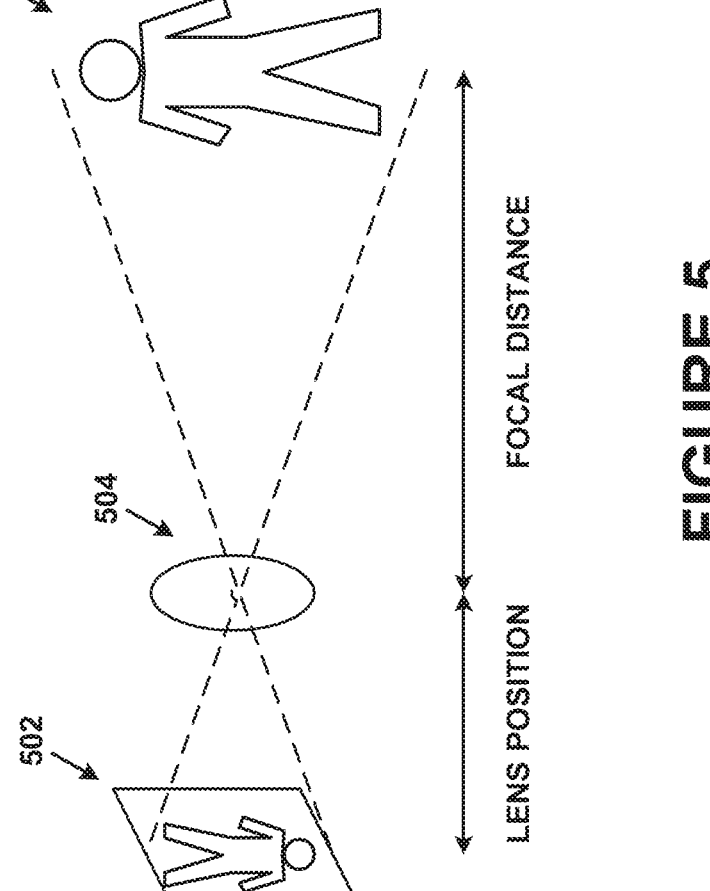
FIG. 5 depicts a simplified representation of an image capture component capturing an image of a person, according to example embodiments.

FIG. 5 is a simplified representation of an image capture component capturing an image of an object. The image capture component may be a camera configured with a recording surface 502 and a lens 504 as well as other components not shown. During image capture, light representing the person 506 and other elements of a scene (not shown) may pass through the lens 504 enabling the camera to subsequently create an image of the person 506 on the recording surface 502. As a result, the camera may display a digital image of the person 506 on a viewfinder. In the embodiment shown in FIG. 5, the image of the person 506 appears upside down on the recording surface 502 due to the optics of the lens 504, but an image process technique may invert the image for display.

For some camera configurations, the lens 504 may be adjustable. For instance, the lens 504 may move left or right adjusting the lens position and focal distance of the camera for image capture. The adjustments may be made by applying a voltage to a motor (not shown in FIG. 5) controlling the position of the lens 504. As such, the motor may move the lens 504 closer to or further from the recording surface 502 enabling the camera to focus on objects (e.g., the person 506) at a range of distances. The distance between the lens 504 and the recording surface 502 at any point in time can be referred to as the lens position and may be measured in millimeters or other units. By extension, the distance between the lens 504 and its area of focus can be referred to as the focal distance, which may be similarly measured in millimeters or other units.

As indicated above, depth estimation techniques may involve using information derived from a person's eye or eyes captured within an image. In particular, a smartphone, server, or another type of computing system may obtain an image and generate a facial mesh for one or more faces depicted within the image. For instance, the device may perform a cursory review using at least one image processing technique to detect and identify the presence of a person's face and subsequently generate a facial mesh that has facial landmarks and eye landmarks mapping the face.

The facial landmarks may map the contours of the face, such as the curvature and position of cheeks, lips, eyebrows, and outline of the face. Similar to the facial landmarks, the eye landmarks may map the contours of at least one eye on the face. For example, the eye landmarks may include a first set of eye landmarks outlining the eye of the face and a second set of eye landmarks mapping the dimensions of the iris of the eye as shown in FIG. 3.

Using the facial mesh, the device may determine information that can be used for depth estimation. For instance, the facial mesh may be used to determine a position of a person's eye within an image captured by a camera. The position of the person's eye may be determined relative to other objects in the scene and may involve using the camera's intrinsic matrix. The facial mesh may also be used to estimate pixel sizes of the eye as depicted in the image. For example, the facial mesh may be used to determine a quantity of pixels (e.g., 5 pixels, dozens) that depict a horizontal (or vertical) diameter of an iris as represented within the image. In particular, a depth estimation technique may involve creating a distance formula based on a combination of eye measurements and the intrinsic matrix of the camera. To further illustrate, the intrinsic matrix of a camera may be represented as follows:

$$K = \begin{bmatrix} f_x & 0 & O_x \\ 0 & f_y & O_y \\ 0 & 0 & 1 \end{bmatrix} \qquad [2]$$

Similar to the matrix shown above in equation 1, this matrix uses $f_x$ and $f_y$ to represent the focal length in pixels with their values equal when the image has square pixels, and $O_x$ and $O_y$ are used to represent the position of the principal point on the image sensor of the camera. In addition, the matrix 2 has the axis skew value set to zero for illustration purposes.

Figure 6:
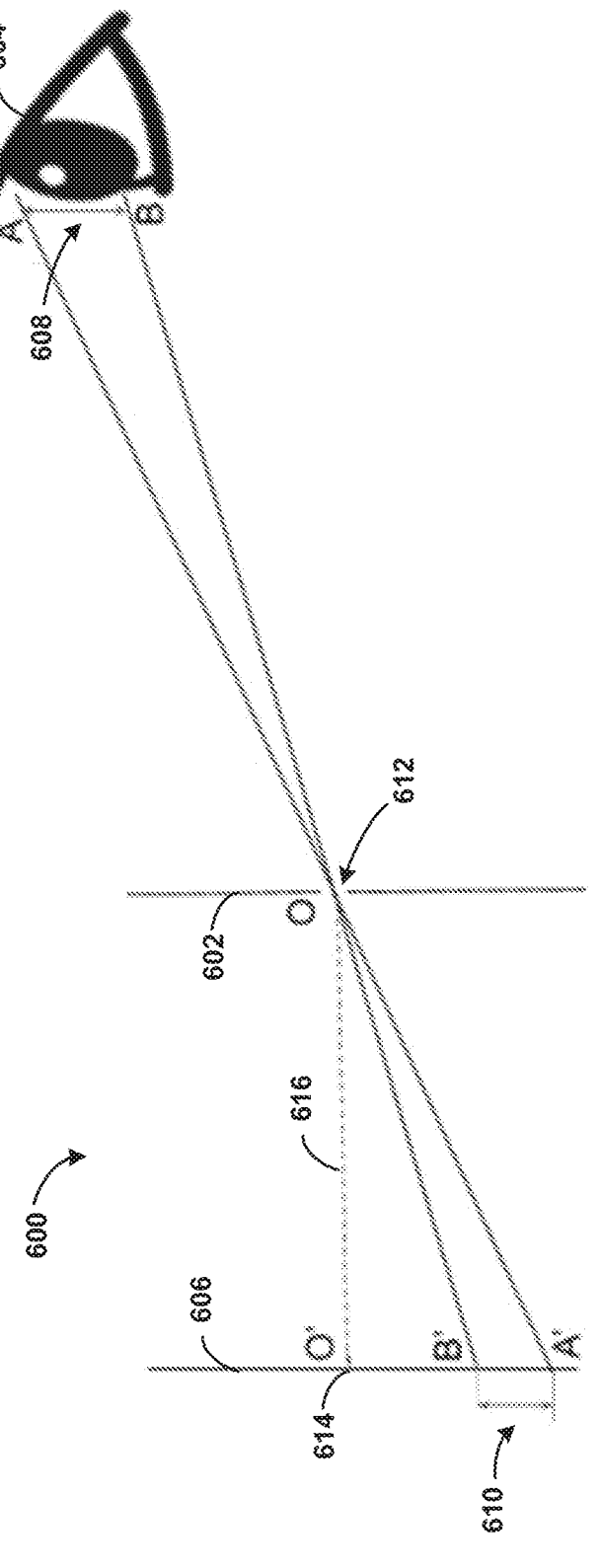
FIG. 6 depicts a simplified representation for depth estimation between a camera and an eye, according to example embodiments.
Figure 7:
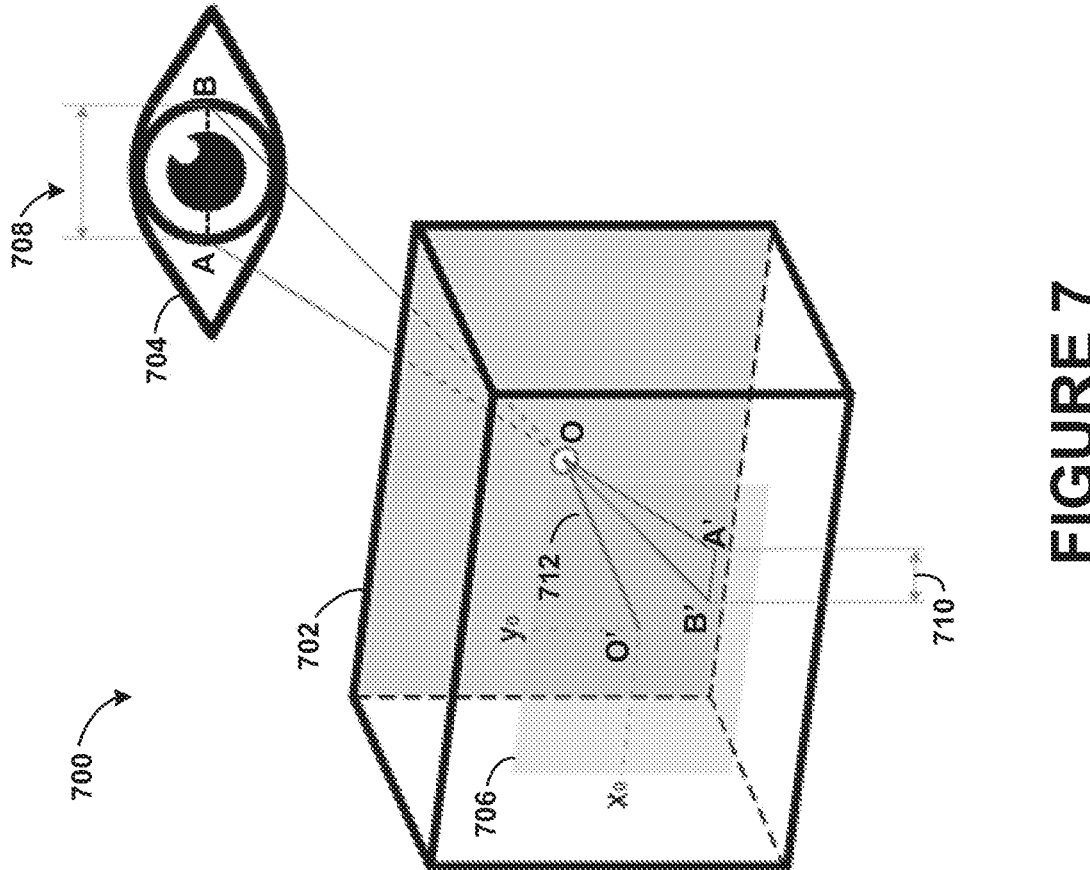
FIG. 7 depicts another simplified representation for depth estimation between a camera and an eye, according to example embodiments.

To further show how the matrix above, an eye pixel estimation, and a corresponding mean value eye dimension may be used to estimate a depth estimate of a person within a scene, FIGS. 6 and 7 illustrate simplified representations for depth estimation between a camera and an eye. In particular, each representation 600, 700 provides a diagram that shows example distances and estimations that may be used along with the intrinsic matrix of the camera to estimate a depth of the eye. Although representations 600, 700 are simplified for illustration purposes showing limited camera components and only eyes, the depth estimation techniques described herein can be used with images depicting more complex scenes.

In the simplified representation 600, a camera may use a lens 602 with pinhole O 612 to capture and generate an image of an eye 604 on a recording surface 606. Using the image, a device may perform one or more estimations of the eye 604 to use in concert with the intrinsic matrix of the camera for depth estimation. The device may determine a first eye dimension based on the size of the eye 604. For example, the device may determine a mean value size of the iris represented in FIG. 6 as iris size AB 608, which may be conveyed in millimeters or another unit. The device may determine the mean value iris size using stored data and/or by obtaining the mean value from another computing system.

In addition, the device may also estimate a size of the iris as depicted within the image on recording surface 606, which is represented as iris pixel size A'B' 610 in FIG. 6. As such, the iris pixel size A'B' 610 may be determined based on a quantity of pixels (or subpixels) within the image and thus represented as a total quantity of pixels. The iris pixel size may differ depending on which measurement the device is estimating (e.g., vertical diameter or horizontal diameter).

The simplified representation 600 also shows the focal length OO' 616 (also referred to as pixel focal length) extending between the center of lens (pinhole O 612) and the principal point O' 614 on the recording surface 606. The focal length OO' 616 may be determined based on the camera's intrinsic matrix and may be represented in millimeters or other units.

As further shown in the simplified representation 600, distances from the center of the lens (pinhole O 612) to point A and point B of the eye 604 can be determined. In particular, a first triangle OAB may be determined based on the distance from the pinhole O 612 to the points A, B using the mean value eye dimension (e.g., iris size AB 608). In addition, a second triangle OA'B' can be determined based on the distance from the pinhole O 612 to the points A' and B' of the image using the estimated iris pixel size A'B' 610.

To construct a depth estimation equation that can be used to estimate a depth of the eye 604 relative to the lens 602, the triangles OAB and OA'B' shown in the simplified representation 600 may then be used to construct the following:

$$\frac{AB}{A'B'} = \frac{OA}{OA'} \qquad [3]$$

$$\frac{AB}{A'B'} = \frac{OB}{OB'} \qquad [4]$$

Equation 3 and 4, derived based on the triangles OAB and OA'B', can be used to calculate the distances to the camera as follows:

$$OA = \frac{AB\sqrt{OO'^2 + |A' - O'|_2^2}}{A'B'} \qquad [5]$$

$$OB = \frac{AB\sqrt{OO'^2 + |B' - O'|_2^2}}{A'B'} \qquad [6]$$

$$distance_{mm} = \frac{iris_{mm}\sqrt{focal\_length_{pixels}^2 + pupil\_to\_focal\_center^2}}{iris_{pixels}} \qquad [7]$$

As shown above, equation 7 may be determined based on equations 5 and 6 and can be used to estimate the distance of the eye 604 (and generally the person's face) relative to the camera. The distance may be estimated in millimeters or other units within examples. Thus, a device may use equation 7 to estimate the depth of a person's face relative to the camera that captured an image using iris size estimations and the camera's intrinsic matrix. In equation 7, the pupil to focal center represents a distance in pixels within the image space from the center of the eye (pupil) and focal origin from the intrinsic matrix.

Similar to the simplified representation 600 shown in FIG. 6, the simplified representation 700 represents another view for depth estimation between a camera and an eye. Particularly, the representation 700 shows a camera using lens 702 to capture an image 706 depicting the eye 704. A device may obtain the image 706 and subsequently determine a mean value iris size AB 708 in millimeters or other units based on stored eye data. In addition, the device may estimate iris pixel size A'B' 710, which represents a size of the iris of the eye 704 in a quantity of pixels as depicted within the image 706. Using one or both of the mean value iris size AB 708, the estimated iris pixel size A'B' 710 along with information from the camera's intrinsic matrix, the device may estimate a distance of the eye 704 relative to the camera. In particular, the distance between the principal point O' and the center O of the lens 702 may correspond to the focal length OO' 712 of the camera in pixels and

5. EXAMPLE IMAGE MODIFICATION

Figure 8:
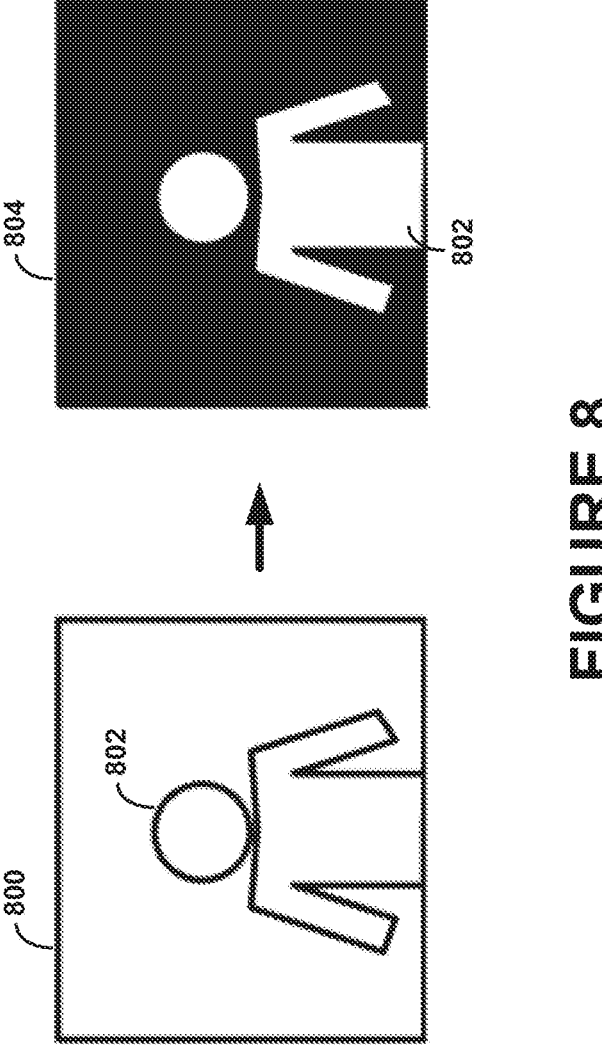
FIG. 8 depicts modifying an image captured using a single image capture component, according to example embodiments.

FIG. 8 illustrates a simplified image modification, according to one or more example embodiments. The simplified image modification shows an input image 800 and an output image 804. Both images depict a person 802 in a simplified portrait position for illustration purposes. Other examples may involve more complex scenes, such as an image depicting multiple people with various backgrounds.

The input image 800 is an image of a person 802 captured a camera, such as front-facing camera 104 of the digital camera device 100 shown in FIG. 1A. In an embodiment, the input image 800 may represent an image captured by a monocular camera with an intrinsic matrix. As such, a computing system may receive the input image 800 from the camera and may also have access to the intrinsic matrix of the camera.

Responsive to receiving the input image 800, the computing system may perform a depth estimation technique to determine a depth of the person 802 relative to the camera that captured the input image 800. As such, the depth estimation may be used to modify the input image 800.

In some examples, modifying the input image 800 may involve enhancing the input image 800 directly or generating an enhanced image (e.g., the output image 804) based on the input image 800. For example, the device may generate a new version of the initial image that includes a focus upon the person 802 while also blurring other portions of the scene, such as the background of the scene (represented by black in the output image 804). The camera device may identify a portion of the image to focus upon depending on a general layout of the scene captured within the image or based on additional information (e.g., a user input that specified a focal point during image capture).

In a further example, a camera may partition an image into multiple segments using an image segmentation process. Each segment may include a set of pixels of the image. The camera may identify segments that share respective characteristics (e.g., represent the person 802) and further identify boundaries of features in the scene based on the segments that share respective characteristics. A new version of the image with the focus upon a person in the scene and with the one or more other portions of the scene blurred may be generated using one of the depth estimation techniques described above.

In another implementation, a camera may receive an input that specifies a particular person in the scene for the camera to focus upon when capturing the image. For example, the camera may receive the input via a touchscreen that displays a view of the scene from a viewpoint of the camera. As such, the camera may estimate the depth of the person in response to receiving the input.

6. CONCLUSION

The present disclosure is not to be limited in terms of the particular embodiments described in this application, which are intended as illustrations of various aspects. Many modifications and variations can be made without departing from its scope, as will be apparent to those skilled in the art.

Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purpose of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining, at a computing system and from a camera, an image depicting a person;

determining a facial mesh for a face of the person based on one or more features of the face, wherein the facial mesh includes at least eye landmarks for an eye of the face, wherein the eye landmarks include a plurality of iris landmarks for an iris of the eye, wherein the plurality of iris landmark define an outline of the iris and a center of the iris;

estimating a pixel size of the iris based on the plurality of iris landmarks that define the outline of the iris and the center of the iris;

estimating, by the computing system, a distance of the eye relative to the camera based on at least the pixel size of the iris, a focal length of the camera in pixels, and a distance in pixels between the center of the iris and a focal origin in the image; and modifying the image based on the distance of the eye relative to the camera.

2. The method of claim 1, wherein the camera is a monocular camera.

3. The method of claim 1, wherein estimating the distance of the eye relative to the camera is further based on a mean value iris dimension.

4. The method of claim 1, further comprising:

responsive to obtaining the image depicting the person, identifying the face of the person in the image using at least one image processing technique.

5. The method of claim 4, wherein the at least one image processing technique involves detecting the one or more features of the face using a trained neural network.

6. The method of claim 1, wherein estimating the pixel size of the iris based on the plurality of iris landmarks that define the outline of the iris and the center of the iris comprises:

estimating a quantity of pixels indicative of a horizontal diameter of the iris of the eye as represented in the image.

7. The method of claim 1, wherein modifying the image based on the distance of the eye relative to the camera comprises:

applying a partial blur to one or more background portions of the image based on the distance of the eye relative to the camera.

8. The method of claim 1, wherein the plurality of iris landmarks include four landmarks positioned around the iris.

9. The method of claim 1, wherein the focal origin in the image is determined from an intrinsic matrix of the camera.

10. A system comprising:

a camera; and a computing system comprising one or more processors and configured to:

obtain, from the camera, an image depicting a person;

determine a facial mesh for a face of the person based on one or more features of the face, wherein the facial mesh includes at least eye landmarks for an eye of the face, wherein the eye landmarks include a plurality of iris landmarks for an iris of the eye, wherein the plurality of iris landmarks define an outline of the iris and a center of the iris;

estimate a pixel size of the iris based on the plurality of iris landmarks that define the outline of the iris and the center of the iris;

estimate a distance of the eye relative to the camera based on at least the pixel size of the iris, a focal length of the camera in pixels, and a distance in pixels between the center of the iris and a focal origin in the image; and modify the image based on the distance of the eye relative to the camera.

11. The system of claim 10, wherein the computing system is further configured to:

perform a comparison between the pixel size of the iris and an average pixel iris size; and based on the comparison, determine whether the pixel size of the iris satisfies a threshold difference; and wherein the computing system is configured to estimate the distance of the eye relative to the camera in response to determining that the pixel size of the iris satisfies the threshold difference.

12. The system of claim 10, wherein the computing system is configured to:

modify the image by applying a partial blur to one or more background portions of the image based on the distance of the eye relative to the camera.

13. The system of claim 10, wherein the plurality of iris landmarks include four landmarks positioned around the iris.

14. The system of claim 10, wherein the distance of the eye relative to the camera is further based on a mean value iris dimension.

15. The system of claim 10, wherein the computing system is configured to estimate the pixel size of the iris based on the plurality of iris landmarks that define the outline of the iris and the center of the iris by estimating a quantity of pixels indicative of a horizontal diameter of the iris of the eye as represented in the image.

16. A non-transitory computer-readable medium configured to store instructions, that when executed by a computing system comprising one or more processors, causes the computing system to perform operations comprising:

obtaining, from a camera, an image depicting a person;

determining a facial mesh for a face of the person based on one or more features of the face, wherein the facial mesh includes at least eye landmarks for an eye of the face, wherein the eye landmarks include a plurality of iris landmarks for an iris of the eye, wherein the plurality of iris landmarks define an outline of the iris and a center of the iris;

estimating a pixel size of the iris based on the plurality of iris landmarks that define the outline of the iris and the center of the iris;

estimating a distance of the eye relative to the camera based on at least the pixel size of the iris, a focal length of the camera in pixels, and a distance in pixels between the center of the iris and a focal origin in the image; and modifying the image based on the distance of the eye relative to the camera.

17. The non-transitory computer-readable medium of claim 16, wherein estimating the pixel size of the iris based on the plurality of iris landmarks that define the outline of the iris and the center of the iris comprises:

estimating a quantity of pixels indicative of a horizontal diameter of the iris of the eye as represented in the image.

18. The non-transitory computer-readable medium of claim 16, wherein estimating the distance of the eye relative to the camera is further based on a mean value iris dimension.

19. The non-transitory computer readable medium of claim 16, wherein modifying the image based on the distance of the eye relative to the camera comprises:

applying a partial blur to one or more background portions of the image based on the distance of the eye relative to the camera.

20. The non-transitory computer readable medium of claim 16, wherein the plurality of iris landmarks include four landmarks positioned around the iris.

\* \* \* \* \*